April 24, 1951 — T. R. JONES — 2,549,972
RELEASABLE AND REVERSIBLE FLOATING TOOLHOLDER
Filed July 9, 1945 — 3 Sheets-Sheet 1
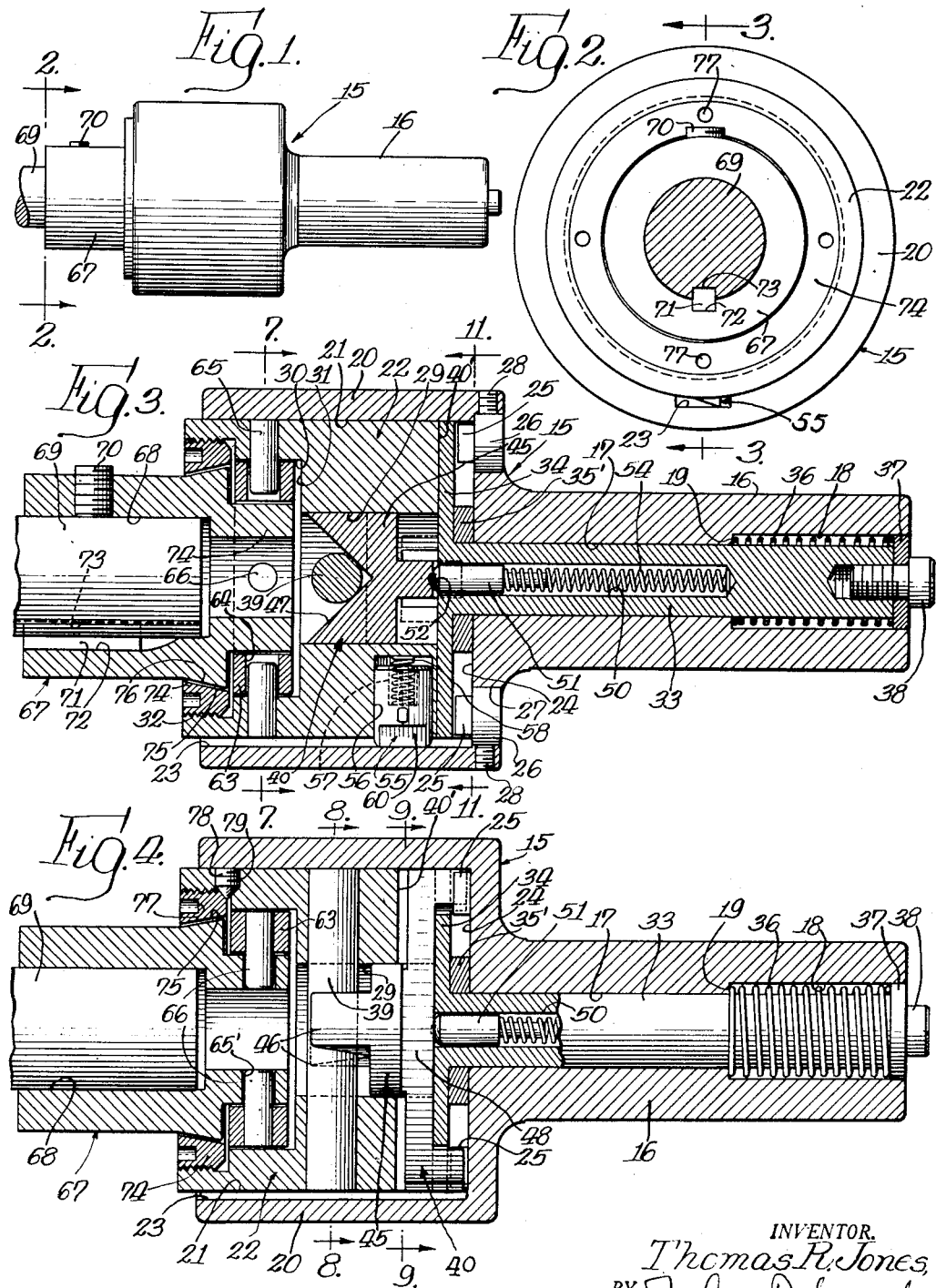
INVENTOR.
Thomas R. Jones,
BY John P. Smith
Atty.

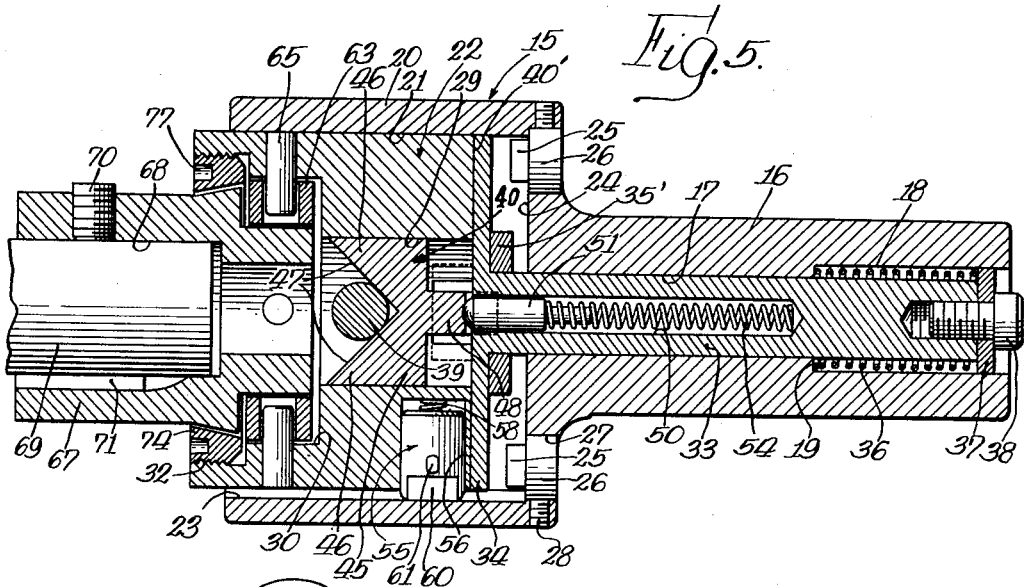
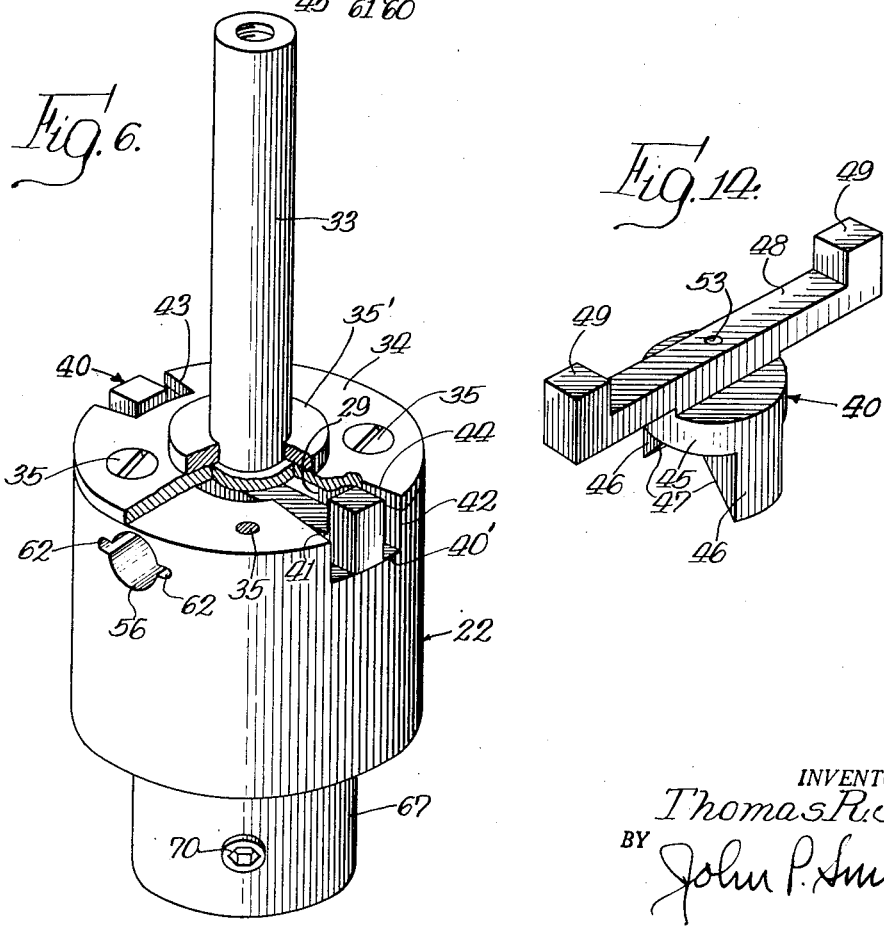

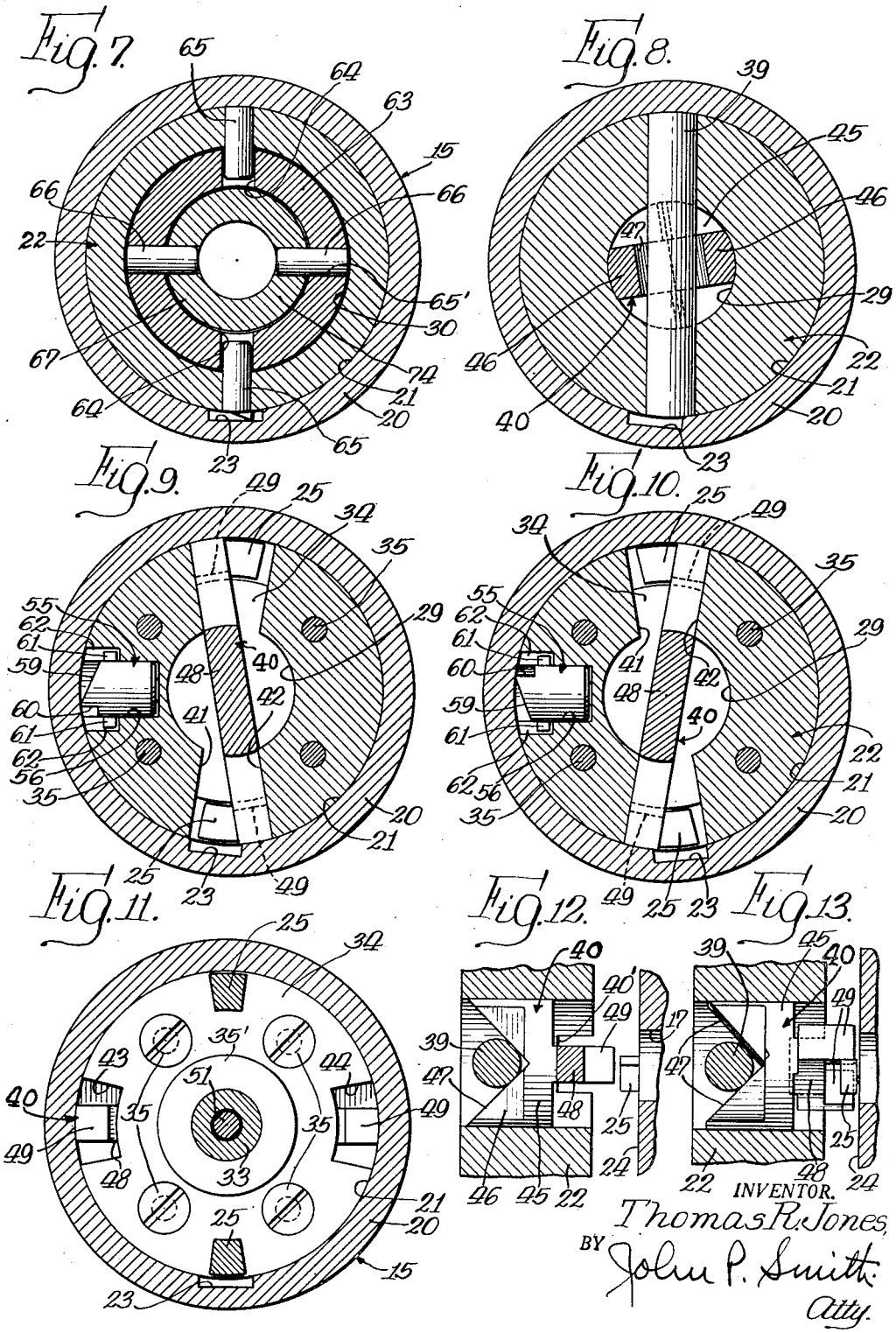

Patented Apr. 24, 1951

2,549,972

UNITED STATES PATENT OFFICE 2,549,972

RELEASABLE AND REVERSIBLE FLOATING TOOLHOLDER

Thomas R. Jones, Chicago, Ill., assignor of one-fifth to John P. Smith, Oak Park, Ill.

Application July 9, 1945, Serial No. 603,928

4 Claims. (Cl. 10—89)

The present invention relates generally to a simple and improved clutch mechanism for tool holder, but more particularly to a releasable as well as reversible clutch mechanism in combination with a freely floating support for the tool whereby the tool may angularly or bodily displace itself with respect to the tool holder proper in aligning the same with respect to the work.

A further object of the invention is to provide a simple and efficient construction of clutch mechanism for a tool holder such as a tap in which the intermittently driven clutch member is provided with automatically retractible driving pawls which permit spacing of the pawls from the driving lugs of the drive member upon the release of the pawls from the driving lugs so as to eliminate the possibility of accidental disengagement and reduce the wear on these parts.

A still further object of the invention is to provide a novel and improved releasable and reversible clutch mechanism for a tool holder having means embodied therein for floatingly supporting a tool to compensate for angular misalignment and parallel misalignment of the tool with respect to the work.

A further object of the invention is to provide a novel and improved clutch mechanism for a tap holder and the like having means embodied therein whereby the holder may be converted from a right hand thread tap holder to a left hand thread tap holder or vice versa by merely reversing the position of a single pawl in one of the holder parts.

These and other objects are accomplished by providing a construction and an arrangement of the various parts in the manner hereinafter described and particularly pointed out in the appended claims.

Referring to the drawings:

Fig. 1 is a side elevational view of my improved combination clutch and tool holder device;

Fig. 2 is an enlarged cross sectional view taken on the line 2—2 in Fig. 1;

Fig. 3 is a longitudinal enlarged cross sectional view taken on the line 3—3 in Fig. 2;

Fig. 4 is a similar cross sectional view showing the manner in which the driving pawls are moved towards the driving lugs when a torque is placed on the driving member;

Fig. 5 is a similar enlarged cross sectional view showing the position of the operating parts of the clutch at the conclusion of the tapping or threading operation;

Fig. 6 is an enlarged perspective view, partly broken, of the intermittently driven clutch member and tool holder member in which the pawl is supported in its normal position;

Fig. 7 is a cross sectional view taken on the line 7—7 in Fig. 3;

Fig. 8 is a cross sectional view taken on the line 8—8 in Fig. 4;

Fig. 9 is a cross sectional view taken on the line 9—9 in Fig. 4;

Fig. 10 is a cross sectional view similar to Fig. 9 showing the removable and reversible pawl in the reverse position and the driven pawls engaging the opposite sides of the lugs for converting the tool holder for a left hand thread tap;

Fig. 11 is a cross sectional view taken on the line 11—11 in Fig. 3;

Fig. 12 is a fragmentary cross sectional view showing the manner in which the driving lugs of the drive member is spaced from the driven pawls at the conclusion of the threading operation;

Fig. 13 is a similar cross sectional view showing the driving lug engaging the driven pawl of the intermittently driven member; and Fig. 14 is a perspective view of the oscillatable and reciprocable pawl member.

The present invention has special reference to a novel releasable and reversible clutch mechanism for floating tool holder and has special reference to and adaptation for the support of a tap for threading work supported on the live or dead spindle of a lathe or the like machine wherein the holder may be converted from a right hand thread tap holder to a left hand thread tap holder by merely reversing or changing the position of one pawl in one of the operating parts of the clutch mechanism. My improved tool or tap holder in combination with my improved releasable clutch mechanism therefor is adapted to be supported on the live or dead spindle of any conventional type of lathe or the like machine so that it will therefore be understood that reference hereinafter to the drive member includes that member which revolves with the live spindle when so mounted or remains stationary with the dead spindle when so mounted to resist the torque imparted to it by the revolving work in the live spindle.

In illustrating one form my invention may assume in practice, I have shown the same as comprising a cylindrical drive member, generally indicated by the reference character 15, which has a longitudinally extending shank 16 for securing the same on the live or dead spindle of a lathe or similar machine. The spindle 16 has a longitudinally extending bore 17 adjacent its inner ends and a relatively larger bore 18 adjacent its outer end, so as to form in effect, a shoulder 19 between these bores. The drive member 16 has a relatively larger cylindrical housing portion 20. The housing portion 20 of the drive member 15 has its cylindrical recess as shown at 21 concentric with the axis of the shank 16 and is adapted to telescopically and reciprocally receive therein an intermittently driven clutch member, generally indicated by the reference character 22. Extending longitudinally of the cylindrical wall 21 of the drive member 15 is a rectangular pawl engaging slot 23 for the purpose hereinafter set forth. The cylindrical recess 21 in the cylindrical portion 20 terminates in a flat face 24. Secured to the face 24 of the drive member 15 and positioned diametrically opposite one another are driving lugs 25. These lugs 25 are formed on cylindrical plugs 26 which in turn, are seated in opposite apertures 27 formed in the transverse wall or face 24 of the drive member 15. These lugs 25 and associated plugs 26 are secured in position by suitable set screws 28 which in turn are mounted in threaded engagement with suitable apertures in the cylindrical portion 20 of the drive member 15.

The intermittently driven clutch member 22 is cylindrical in shape and complementary to the cylindrical recess 21 of the drive member 15 so that it is free to rotate and reciprocate therein in the manner hereinafter described. Located in the approximate center of the intermittently driven clutch member 22 is a cylindrical bore 29 and a relatively larger annular recess 30 arranged concentrically with respect to the bore 29 so as to form in effect the shoulder 31 therebetween. The outer end of the intermittently driven clutch member 22 terminates in a relatively larger concentric annular recess in which are formed internal threads as shown at 32 for the purpose hereinafter set forth. Reciprocally and rotatably mounted in the bore 17 of the shank 16 of the drive member 15 is a spindle 33. The inner end of the spindle 33 has a disc-like plate member 34 formed integrally therewith. The disc-like member 34 is secured to the intermittently driven clutch member 22 by means of machine screws 35. Secured to or formed integrally with the spindle 33 is a washer-like member 35' which holds the clutch member 22 spaced from the face 24 of the drive member 15. The intermittently driven clutch member 22 is normally urged inwardly with respect to the drive member 15 by a compression spring 36 which is seated in the cylindrical bore 18 surrounding the spindle 33 with one end thereof resting on the shoulder 19 and the other end thereof engaging a washer 37. The washer 37 is secured to the outer end of the spindle 33 by a machine screw 38. Secured to the intermittently driven clutch member 22 and extending across the diameter thereof within the longitudinal bore 29 is a pin or shaft 39. Mounted on the pin 39 is an oscillatable and longitudinally reciprocable self-centering pawl member generally indicated by the reference character 40, the function of which will hereinafter be more fully described. The inner face of the intermittently driven clutch member 22 has transversely and diametrally extending rectangular recesses 40' which form in effect substantially radially projecting walls 41 and 42. In registering alignment with these walls 41 and 42 are diametrally opposite rectangular recesses 43 and 44 formed in the peripheral edges of the plate 34. These recesses in the member 22 and plate 34 are for the purpose of accommodating the oscillatable and longitudinally reciprocable pawl member 40 shown in Fig. 14 of the drawings. This retractible self-centering pawl member 40 comprises a disc-like portion 45 which is complementary to and journaled in the bore 29 of the clutch member 22 and is also adapted to reciprocate therein. Formed integrally with the disc-like portion 45 of the member 40 are longitudinally projecting and spaced apart pin engaging portions 46. The inner faces of these portions 46 form a V-shape or bevel surfaces as shown at 47. These surfaces 47 form a dihedral angle and occupy planes at approximately 45° with respect to the longitudinal axis of the holder proper as viewed from Fig. 3 of the drawings. Formed integrally with the disc-like portion 45 on the other face thereof is a diametral or transverse rectangular bar 48 which is adapted to extend through the radially projecting rectangular recesses 40' in the clutch member 22 as shown in Fig. 6 and Fig. 11 of the drawings. Formed on the opposite ends of the transverse bar 48 are longitudinally projecting pawls or lug engaging portions 49 which are adapted to be engaged by the lugs 25 of the drive member 15 in the manner hereinafter described. Located in the longitudinal center of the spindle 33 and on the inner end thereof is a bore 50. Reciprocally mounted in the inner end of the bore 50 is a plunger 51. One end of the plunger 51 has a round head as shown at 52 which is adapted to seat in a rounded recess 53 formed in the axial center of the transverse bar 48 of the pawl member 40. The plunger 51 is normally pressed into engagement with the pawl member 40 by a compression spring 54 which is mounted in the bore 50 of the spindle 33. From the above description it will be readily seen that the spring actuated plunger 51 normally presses or retracts the pawl member 40 toward the pin 39 so that the beveled surfaces 47 lie in planes parallel to the axis of the pin 39, thereby urging the pawl member 40 to the center position of the recesses 40' or in the position shown in Figs. 6 and 11 of the drawings. When the pawl member 40 is revolved in either direction with respect to the pin 39 by the lugs 25 of the drive member 15 engaging the pawl members 49, the edges of the bevel surfaces 47 engaging the pin 39 urge the pawl member in a direction away from the pin 39 against the spring pressure action of the plunger 51, as shown in Fig. 4 of the drawings. This longitudinal movement of the bar 48 and its associated pawls 49 increases the engaging surface with the lugs 25 in the driving position and increases the clearance between these pawls and lugs in the non-engaging position. The self-centering bar 48, in other words, retracts its pawl from the lugs in neutral position to provide sufficient clearance and prevents clicking, wearing and accidental contact of these parts and thereby prolongs the life and efficiency of the tool holder. In the normal or home position when there is no torque exerted on the drive member 15 or member 22, the transverse pin 39 is located parallel to the bar 48 of the pawl member 40 and the operating parts are in the positions shown in Figs. 3, 6 and 11 of the drawings. In this connection it will be noted that when the drive member 15 or intermittently driven clutch member 22 is actuated or revolved with respect to one another, the pawl members 49 will be brought into contact with the driving lugs 25 of the drive member 15. By this movement the pawl member 40 will be urged from the position shown in Figs. 6 and 11 to the position shown in Figs. 4 and 9 of the drawings, by reason of the bevel projections 46 being revolved slightly on the pin 39 so to compress the plunger 51 and move the pawls 49 towards and to a greater area of engagement with the driving lugs 25 of the drive member 15. However, when the torque is released between the drive and driven members by reason of completion of the threading operation and the automatic longitudinal withdrawal of the clutch member 22 with respect to the drive member 15, the opposite pawls 49 will disengage the lugs 25 and the plunger 51 will revolve the pawl member 40 by reason of the beveled surfaces 47 from the position shown in Figs. 4 and 9 to that shown in Figs. 5 and 6 of the drawings, thereby giving greater clearance between the driving lugs and pawls and prevent accidental engagement as well as wear on these operating parts.

One of the primary features of the present invention is the provision of means whereby the clutch mechanism and tap holder may be converted from a right hand tap holder to a left hand tap holder by the simple expedient of reversing or changing the position of one of the pawls as hereinafter described. This novel arrangement includes a reversible pawl generally indicated by the reference character 55 which is reciprocally mounted in a radially disposed aperture 56 of the intermittently driven clutch member 22. The pawl 55 is cylindrical in cross section and has a longitudinal bore 57 therein in which is seated the compression spring 58 which has its inner end contacting the bottom of the bore 56 of the clutch member 22. The outer end of the pawl 55 is beveled as shown at 59 so that it may ride readily by the longitudinal slot 23 of the drive member 15 in one direction, but engage one of the radial walls of the slot 23 by its forward edge 60. Projecting from the opposite sides of the pawl 55 and secured thereto are pins 61 which engage complementary and radially disposed recesses 62 adjacent to and communicating with the aperture or bore 56 in the clutch member 22. From the above description it will be obvious that the pawl member 55 may be withdrawn and turned through an angle of 180° so as to change it from the position shown in Fig. 9 to the position shown in Fig. 10 of the drawings. When the pawl 55 is in the position shown in Fig. 9, the tool holder and clutch mechanism may be used for a right hand tap and when the pawl is changed to the position shown in Fig. 10, the holder is converted so that it may be used as a left hand tap holder for threading a left hand thread.

When the clutch member 22 is longitudinally withdrawn from the drive member 15 to the position shown in Fig. 5 of the drawings, the clutch drive member 15 is thereby released automatically at the completion of the tapping operation so that the clutch member 22 is free to revolve with the work and the pawl 55 is so positioned to "click" or ratchet pass the slot 23 in the drive member. When the live spindle of the lathe which supports the work is revolved in the reverse direction by reversing the drive of the lathe, the forward edge 60 of the pawl 55 will then engage one of the walls of the slot 23 to unscrew the tap from the work. The position of the pawl 55 in Fig. 9 of the drawings converts the holder for tapping a right hand thread. When the tap is released from the work, the spring 36 returns the clutch member 22 inwardly with respect to the drive member 15 to the position shown in Fig. 3 of the drawings.

In combination with my improved construction of releasable and reversible clutch mechanism for tool holder, I have provided novel means for supporting the tool in the intermittently driven clutch member 22 so that it may angularly and bodily displace itself with respect to the tool holder proper so as to compensate for out of parallel disalignment and parallel disalignment of the axis of the tool with respect to the work. The construction of this floating tool holding means is substantially like the construction disclosed in my co-pending application, Serial No. 535,519 filed May 13, 1944, now Patent No. 2,416,586. This mechanism includes a ring 63 which is provided with diametral apertures 64. Through the medium of these apertures 64 the ring 63 is pivotally mounted and transversely movable on opposite and aligned pins 65 which have their outer ends secured to the clutch member 22. These pins 65 are secured to the intermittently driven clutch member 22 so as to support the ring 63 in the axial recesses 30 in a position slightly spaced from the face 31 of the clutch member 22. Secured in apertures 65' in the ring 63 and located at right angles to the pins 65 are a second set of pins 66. All of these pins are located in substantially the same transverse plane. The outer ends of the pins 66 are rigidly secured to the ring 63 and project inwardly with respect to the ring. Pivotally mounted on the inner ends of the pins 66 and transversely movable in an axial direction with respect to the pins 66 is a tool holding member generally indicated by the reference character 67. This tool holder member 67 has a longitudinal bore 68 for receiving and securing therein a tool, such as a tap 69, by means of a set screw 70. If desirable, a key 71 may be seated in suitable aligned keyways 72 and 73 in the respective member 67 and tap 69. The inner end of the member 67 has a reduced annular collar 74 which extends into the opening of the ring member 63 to form the pivotal connection on the pins 66 for the tool holder member 67. The outside diameter of the annular collar 74 is smaller than the inside diameter of the opening in the ring member 63 so as to permit diametral displacement of the member 67 longitudinally of these pins 66 as well as pivotal displacement. From the above description it will be obvious that since the tool holder member 67 can move bodily and angularly about the pins 66 and also bodily and angularly with respect to the pins 65, the tool 69 and tool holder member 67 may freely or floatingly displace themselves as a unit with respect to the intermittently driven clutch member 22 so that the same may compensate for angular or bodily displacement of the tool in any direction with respect to the work so as to insure perfect concentricity of the threading operation with respect to the bore and other outside or inside diameters of the work. This freely floating tool holder mechanism also insures a withdrawal of the tap after the threading operation without mutilation or scoring of the thread since the tool holder functions with as great efficiency in the withdrawal operation as in the threading operation. The range of floating movement of the tool 69 and holder member 67 may be controlled or regulated by an adjustable externally threaded washer 74 which has its external threads mounted in threaded engagement with the internal threads 32 of the clutch member 22.

The internal surface of this washer is beveled as shown at 75c which is adapted to engage a complementary beveled surface 76 formed on and adjacent the inner end of the member 67. The outer face of the threaded washer has a plurality of uniformly spaced apart sockets as shown at 77 for insertion of an instrument or tool for adjusting the washer with respect to the clutch member 22. The washer 74 may be locked in position after being properly adjusted by a set screw 78 which is mounted in threaded engagement with a threaded bore 79 located in the periphery of the clutch member 22 as clearly shown in Fig. 4 of the drawings.

Summarizing the advantages and functions of operation of my improved, simplified and compact releasable and reversible clutch mechanism for tool holder, it will, of course, be understood that the same is to be used in connection with a conventional type of automatic lathe or like machine which is provided with the usual longitudinally movable and manually controlled carriage. This carriage usually carries the dead spindle and is movable to and from the live spindle. Such machines are also provided with an adjustable stop which is employed, for example, of limiting the depth to which the threads are to extend into the work held by the live spindle.

When the present tool holder is mounted on the lathe by securing the shank 16 to the dead spindle of the lathe and the carriage of the dead spindle and tool holder in the tapping operation reaches its previously set stop as above indicated, then the tap 69 is about to reach the conclusion of its threading operation. At this time the driving lugs 25 of the drive member 15 will continue in engagement with the pawls 49 to cut an additional thread or so, or until such time as the intermittently driven clutch member 22 is withdrawn sufficiently from the drive member 15 to release the pawls 49 from the lugs 25, or to the position shown in Figs. 5 and 12 of the drawings. At that instance the torque is released on the drive member and the spring pressed plunger 51 will return the pawl member 49 to rectracted or central position as shown in Figs. 6 and 11 of the drawings. This affords greater clearance between the pawls 49 and the lugs 25 when the tap and clutch member 22 revolve with the work. When the live spindle of the lathe which carries the work is reversed in its direction of rotation, the pawl 55 will engage the slot 23 in the drive member 15 to clutch the clutch members 22 and 15 together and thereby unscrew the tap from the work. In this connection it will be understood that the manually controlled means for moving the carriage of the dead spindle on the lathe will be actuated in a direction away from the work so as to hold the pawls 49 out of engagement with the lugs 25 of the drive member until such time as the tap is completely withdrawn from the work. During this withdrawing operation, the clutch member 22 and the driven member 15 are maintained in substantially the position shown in Fig. 5 of the drawings. After the tap is completely withdrawn from the work, the spring 36 will automatically return the clutch member 15 from the position shown in Fig. 5 to the position shown in Fig. 3 of the drawings preparatory to threading or tapping the next piece of work.

In the foregoing description the operation of the tool holder and clutch mechanism has been described for threading a right hand thread. In order to convert the holder for threading a left hand thread, a simple change in the position of the pawl 55 is all that is required. To accomplish this, the machine screw 38 is removed and the clutch member 22 withdrawn from the drive member 15 so that access to the pawl 55 may be had. The pawl 55 is then removed from the recess 56 and turned 180° and reinserted with the opposite pins 61 of the pawl engaging the recesses 62 in the clutch member 22. In other words, to make this conversion, the pawl 55 is changed from the position shown in Fig. 9 to the position shown in Fig. 10.

From the above description it will be readily seen that I have provided not only a simple, compact and efficient releasable clutch mechanism for a tool holder, but also a construction in which the holder may be converted from a right hand thread tap holder to a left hand thread tap holder or vice versa by a simple expedient of reversing one of the parts. It will also be seen that by combining a freely movable support in the intermittently driven clutch member for the tool or tap, the latter can bodily or angularly adjust itself to compensate for parallel disalignment or out-of-parallel misalignment during the threading operation or during the withdrawal of the tool from the work.

While in the above specification I have described one form which my invention may assume in practice, it will of course be understood that the same is capable of modification and that modification may be made without departing from the spirit and scope of the invention as expressed in the following claims.

What I claim as my invention and desire to secure by Letters Patent is:

1. A clutch mechanism for a tool holder comprising a cylindrical drive member having a longitudinal bore and an enlarged circular recess at one end thereof, a complementary intermittently driven clutch member mounted telescopically within said drive member, a compression spring mounted in one of said members for yieldingly holding said members together, driving lugs carried by said drive member, a transversely extending pawl member pivoted on and movable longitudinally with respect to said intermittently driven member, pawls formed on the outer ends of said pawl member and engageable with said lugs, a transverse pin carried by said intermittently driven clutch member, said pawl member having a V-shaped recess normally contacting said pin, a spring pressed plunger mounted in said intermittently driven clutch member and engageable with said pawl member for actuating said pawl member in a direction away from said lugs, a second pawl mounted on said intermittently driven clutch member and engageable with said drive member, and means carried by said driven member for supporting a tool on said intermittently driven clutch member.

2. A clutch member for a tool holder comprising a drive member and a driven member, driving lugs carried by said drive member, a pawl member pivoted on and movable longitudinally with respect to said driven member, pawls formed on one side only of said pawl member, oppositely disposed and parallel lug engaging surfaces formed on each of said pawls and engageable with said lugs for driving said driven member in either direction, a transverse member carried by said driven member, said pawl member having a recess normally contacting said transverse member, spring actuated means carried by said driven member and engageable with said pawl member for urging said pawl member away from said lugs, a second pawl mounted on said driven member and engageable with said drive member, and means carried by said driven member for supporting a tool on said driven member.

3. A clutch mechanism for a tool holder comprising a cylindrical drive member having a longitudinal bore and an enlarged circular recess at one end thereof, a complementary intermittently driven clutch member mounted telescopically within said drive member, a compression spring mounted in one of said members for yieldingly holding said members together, driving lugs carried by said drive member, a transversely extending pawl member pivoted on and movable longitudinally with respect to said intermittently driven member, pawls formed on the outer ends and on one side only of said pawl member, oppositely disposed and parallel lug engaging surfaces formed on each of said pawls and engageable with said lugs for driving said driven member in either direction, a transverse pin carried by said intermittently driven clutch member, said pawl member having a recess normally contacting said pin, a spring pressed plunger mounted in said intermittently driven clutch member and engageable with said pawl member for actuating said pawl member in a direction away from said lugs, a second pawl mounted on said intermittently driven clutch member and engageable with said drive member, and means carried by said driven member for supporting a tool on said intermittently driven clutch member.

4. A clutch member for a tool holder comprising a drive member and a driven member, driving lugs carried by said drive member, a pawl member pivoted on and movable longitudinally with respect to said driven member, pawls formed on one side only of said pawl member, oppositely disposed parallel lug engaging surfaces formed on each of said pawls and engageable with said lugs for driving said driven member in either direction, a transverse member carried by said driven member, said pawl member having a recess normally contacting said transverse member, a spring pressed plunger mounted on said driven clutch member and engageable with said pawl member for actuating said pawl member away from said lugs, a second pawl mounted on said driven member and engagable with said drive member, and means carried by said driven member for supporting a tool on said driven member.

THOMAS R. JONES.

REFERENCES CITED

The following references are of record in the file of this patent:

UNITED STATES PATENTS

| Number | Name | Date |
| --- | --- | --- |
| 560,083 | Carpenter | May 12, 1896 |
| 627,529 | Randles | June 27, 1899 |
| 726,674 | Goodrich | Apr. 28, 1903 |
| 1,254,933 | Peuch | Jan. 29, 1918 |
| 1,308,681 | Prideaux | July 1, 1919 |
| 1,740,887 | Crosby | Dec. 24, 1929 |
| 2,057,761 | Bolton | Oct. 20, 1936 |
| 2,061,787 | Warner | Nov. 24, 1936 |
| 2,140,975 | Welch | Dec. 20, 1938 |
| 2,147,203 | Kylin | Feb. 14, 1939 |
| 2,206,047 | Poorman | July 2, 1940 |
| 2,348,727 | Cote | May 16, 1944 |
| 2,434,075 | Kelley | Jan. 6, 1948 |

FOREIGN PATENTS

| Number | Country | Date |
| --- | --- | --- |
| 106,736 | Great Britain | June 7, 1917 |
| 548,056 | Great Britain | Sept. 23, 1942 |